United States Patent [19]

Colarelli, III

[11] Patent Number: 5,379,636
[45] Date of Patent: Jan. 10, 1995

[54] PLATE BRAKE TESTER APPARATUS AND METHOD

[75] Inventor: Nicholas J. Colarelli, III, Creve Coeur, Mo.

[73] Assignee: Hunter Engineering Company, Bridgeton, Mo.

[21] Appl. No.: 30,595

[22] Filed: Mar. 11, 1993

Related U.S. Application Data

[60] Continuation of Ser. No. 806,138, Dec. 12, 1991, Pat. No. 5,230,242, which is a division of Ser. No. 533,502, Jun. 5, 1990, Pat. No. 5,083,456.

[51] Int. Cl.$^6$ .............................................. G01L 5/28
[52] U.S. Cl. ........................................................ 73/122
[58] Field of Search ............................. 73/121–126, 73/1 R

[56] References Cited

U.S. PATENT DOCUMENTS

| | | |
|---|---|---|
| 2,664,745 | 1/1954 | Merrill et al. |
| 4,011,751 | 3/1977 | Weiss et al. |
| 4,520,663 | 6/1985 | Moore et al. |
| 4,573,350 | 3/1986 | Anderson |
| 4,812,744 | 3/1989 | Havel |
| 4,912,458 | 3/1990 | Coneau et al. |

Primary Examiner—Robert Raevis
Attorney, Agent, or Firm—Polster, Lieder, Woodruff & Luchessi

[57] ABSTRACT

The brakes of a two-axle vehicle are tested by weighing the vehicle and measuring the braking forces for both axles to determine the actual ratio of front axle braking force to total braking force. The deceleration applied to the vehicle is determined from the weight of the vehicle and the applied braking forces. A nominal preferred value of the ratio of front axle braking force to total braking force is calculated from the determined deceleration and the measured weight of the vehicle. The nominal preferred value varies from test to test with both the actual deceleration and the vehicle weight. For each test, upper and lower limits for the acceptability of the actual ratio of front axle braking force to total braking force are set based upon the computed nominal preferred value. These limits move from test to test with the computed nominal preferred value. The nominal preferred value, the movable limits, and the actual ratio are displayed to the user on a CRT screen. The actual ratio is displayed in the form of a bar on the screen, with the limits and nominal preferred value displayed as non-numeric indicia along the longitudinal axis of the bar.

5 Claims, 6 Drawing Sheets

PLATE BRAKE TESTER APPARATUS AND METHOD

This is a continuation of copending application Ser. No. 07/806,138 filed on Dec. 12, 1991, U.S. Pat. No. 5,230,242, which is a divisional of Ser. No. 07/533,502 filed on Jun. 5, 1990, U.S. Pat. No. 5,083,456.

BACKGROUND OF THE INVENTION

This invention relates to brake testing systems, and particularly to such systems for testing the adequacy of the brakes of automobiles and similar two-axle vehicles.

Faulty or inadequate brakes are a significant cause of automobile accidents. Moreover, the faulty condition of the brakes is often not apparent during routine use of the brakes. The operator of the vehicle is usually not aware, until it is too late, that the vehicle's brakes are deficient.

Furthermore, many brake defects are not readily apparent during a visual inspection of the brakes. Only a test simulating actual shopping conditions can detect many brake defects.

When the brakes of a vehicle are applied, a retarding force is generated between the tire and the surface on which the tire is riding. When this force becomes greater than the weight on that wheel multiplied by the coefficient of friction between the tire and the surface, the wheel will begin to lock up and stop rolling. The retarding force of a wheel just before lockup is greater than the retarding force of the same wheel just after lockup. In addition, a locked wheel loses its ability to maintain lateral forces, which makes handling very difficult—especially when the rear wheels lockup.

Since the maximum usable force of a brake is related to the weight on that wheel, vehicle designers adjust the braking system so that the brake force distributions coincide with the vehicle weight distribution. Since the left side of the car weighs very close to the right side of the car, there is rarely a difference in design between brakes on the same axle. However, since most passenger cars weigh more on the front axle than on the rear axle, front brakes are almost always designed to handle more brake force than rear brakes.

When a vehicle is decelerating, the forces acting on the center of gravity of the vehicle cause a weight shift. The front axle weight is increased, and the rear axle weight is decreased. This increases the chance of rear axle lockup since the same brake force is now retarding a smaller tire-to-road force. This situation is dangerous since locked tires cannot hold their lateral forces. The rear axle will begin to "fishtail" and eventually the vehicle will go into a spin. For this reason, brake systems include a proportioning valve that senses high brake pressures and reduce hydraulic pressure to the rear axle brakes during hard stops.

The ideal vehicle is designed to be "neutral balance," which means that no one wheel will lock up prematurely. If the rear axle locks up first, a vehicle is said to be "rear biased." If the front axle locks up first, the vehicle is "front biased." Many vehicle manufacturers design slightly front biased vehicles in order to avoid the dangerous rear lockup situation.

Apparatus for testing brake performance are available, but they could be improved. For example, the results of the brake test under actual stopping conditions can depend upon the make and model of the vehicle, the actual deceleration applied to the vehicle during the test, and the static and dynamic weight distribution of the vehicle during the test. Apparatus which would take into account all these factors have heretofore been considered too complicated or too slow. For example, a system which would take into account the make and model of the actual vehicle under test would appear to require that the operator enter that information into the system. Entering this information, however, unacceptably increases the total time required for performing what is otherwise a short (thirty second) test.

Present brake testing systems compensate for the lack of information about the specific vehicle under test and the dynamic weight distribution under test by setting broader than necessary ranges for the acceptability of the measured braking forces. In some cases these broad ranges allow vehicle brakes to "pass" which, for that particular vehicle and deceleration, should have failed.

In order to expedite testing the vehicle's brakes, it is also desirable to display to the operator the test results while the operator is still in the vehicle. Some present brake testers accomplish this with a pair of indicator lights, one for "pass" and the other for "fail." This, of course, is not particularly satisfying for the consumer who is faced with the prospect of unanticipated brake work. A display which clearly indicates the precise nature of the defect would be desirable.

In addition, for a test to be valid, it is necessary that a certain minimum deceleration be applied to the vehicle. Present brake testers do not immediately and clearly indicate to the operator, while he is still in the vehicle, that the deceleration was too low. If the operator could tell at a glance that the deceleration was too low, he could simply redo the test while seated in the vehicle.

SUMMARY OF THE INVENTION

Among the various objects and features of the present invention may be noted the provision of an improved system for testing vehicle brakes.

Another object is the provision of such a system which provides quick and accurate testing of vehicle brakes.

A further object is the provision of such a system which accurately takes into account the dynamic weight distribution of the vehicle under test without delaying test results.

A fourth object is the provision of such a system which automatically compensates for vehicular differences.

A fifth object is the provision of such a system which provides movable limits which depend upon the actual deceleration and the actual weight distribution of the vehicle under test.

A sixth object is the provision of such a system which clearly and immediately displays the results of the test in a form which is readily understood.

Other objects and features will be in part apparent and in part pointed out hereinafter.

Briefly, in a first aspect the method of the present invention is directed to testing the adequacy of the brakes of a two-axle vehicle, which method includes weighing the vehicle under test and measuring the braking forces for both axles of the vehicle under test to obtain a first figure representing the front axle braking force and a second figure representing the rear axle braking force. The deceleration applied to the vehicle under test as a result of the measured braking forces is determined from the measured weight of the vehicle and the measured braking forces. After the vehicle under test is weighed and the deceleration determined, a nominal preferred value of a function of the front axle braking force and the rear axle braking force (such as the ratio of front axle braking force to total braking force) is computed from the determined deceleration and the measured weight of the vehicle. This nominal preferred value varies from test to test with both the actual deceleration and the vehicle weight. The actual value of the function of the front axle braking force and the rear axle braking force is computed from the first and second figures for the vehicle under test. And, for each test, upper and lower limits for the acceptability of the actual value of the function are set based upon the computed nominal preferred value. These upper and lower limits move from test to test with the computed nominal preferred value.

In a second aspect, the method of the present invention includes weighing the vehicle under test and measuring the braking forces for both axles of the vehicle under test to obtain a first figure representing the front axle braking force and a second figure representing the rear axle braking force. The deceleration applied to the vehicle under test as a result of the measured braking forces is determined and a nominal preferred value of a function of the front axle braking force and the rear axle braking force is computed from the determined deceleration and the measured weight of the vehicle. The nominal preferred value varies from test to test with both the actual deceleration and the vehicle weight. The actual value of the function of the front axle braking force and the rear axle braking force is computed from the first and second figures for the vehicle under test. The computed nominal preferred value and the computed actual value for the vehicle under test are displayed simultaneously.

Vehicle brake testing apparatus of the present invention includes sensors for measuring the braking forces applied during testing by all four wheels of a four-wheeled vehicle and circuitry responsive to the measuring sensors for computing at least one ratio of the measured braking forces. A display is provided for displaying the computed ratio. The display includes circuitry for displaying a bar whose length is proportional to the computed ratio. The display also displays non-numeric indicia along the longitudinal axis of the bar display, the positions of the non-numeric indicia representing acceptable first and second limits for the computed ratio.

A corresponding method of the present invention includes measuring the braking forces applied during testing of all four wheels of a four-wheeled vehicle and computing at least one ratio of the measured braking forces. The computed ratio is displayed as a bar whose length is proportional to the computed ratio. Non-numeric indicia are displayed along the longitudinal axis of the bar at positions representing first and second acceptable limits for the computed ratio.

In another aspect apparatus of the present invention for testing the adequacy of the brakes of a two-axle vehicle includes weighing sensors for weighing the vehicle under test and measuring sensors for measuring the brake forces for both axles of the vehicle under test to obtain a first figure representing the front axle braking force and a second figure representing the rear axle braking force. Electronic computing circuitry responsive to the weighing sensors and to the measuring sensors determine the deceleration applied to the vehicle under test as a result of the measured braking forces, compute from the weight and deceleration a nominal preferred value of a function of the front axle braking force and the rear axle braking force (which nominal preferred value varies from test to test with both the actual deceleration and the vehicle weight), and compute the actual value of the function of the front axle braking force and the rear axle braking force from the first and second figures for the vehicle under test. A display displays the computed nominal preferred value and the computed actual value of the function for the vehicle under test.

BRIEF DESCRIPTION OF THE DRAWINGS

Similar reference characters indicate similar parts throughout the several views of the drawings.

DESCRIPTION OF THE PREFERRED EMBODIMENT

Figure 2:
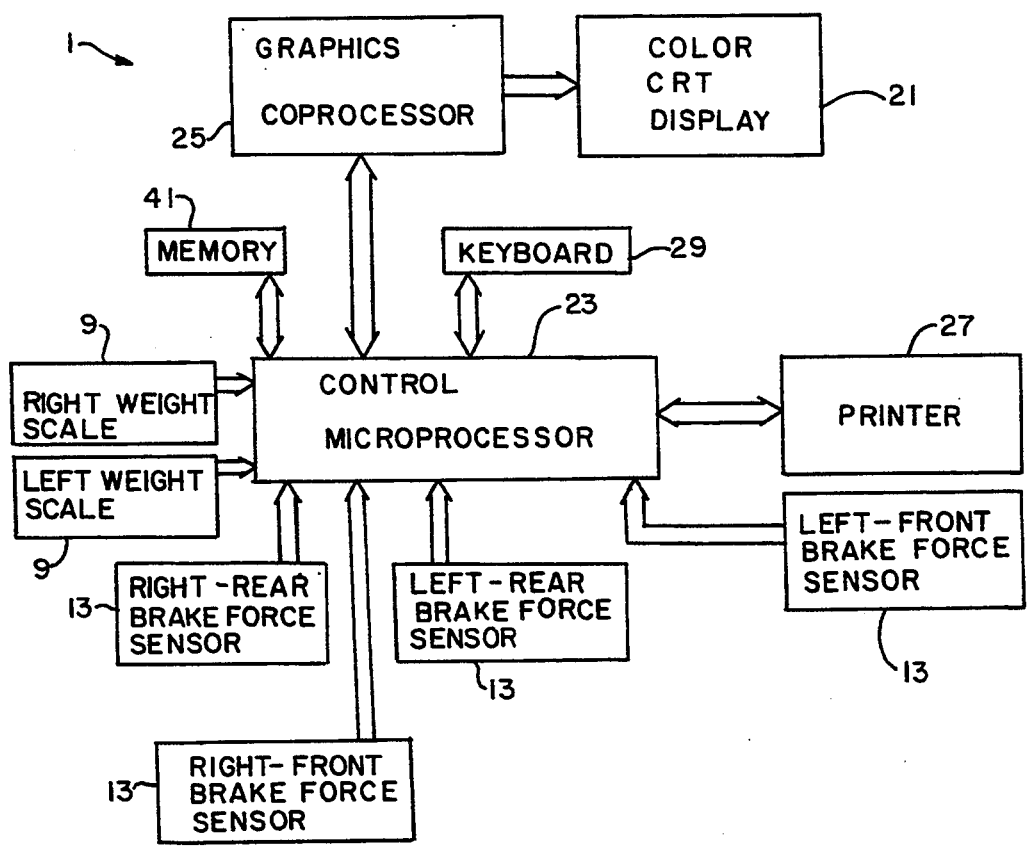
FIG. 2 is a block diagram of the brake testing system of FIG. 1.
Figure 3:
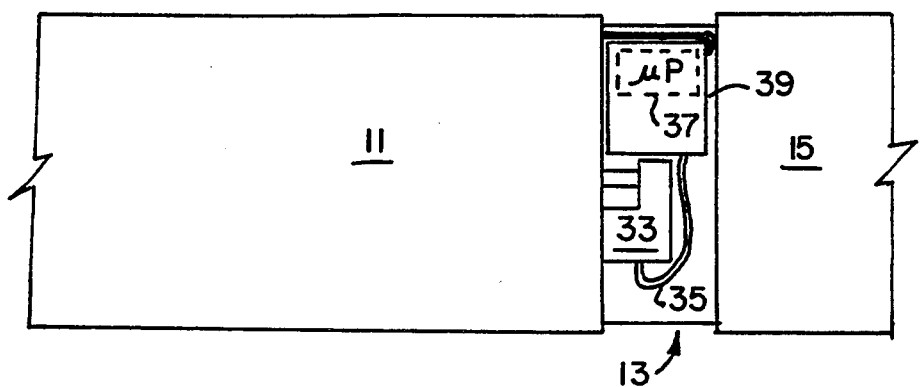
FIG. 3 is a top plan, with parts removed for clarity and on an enlarged scale, of a brake force sensing mechanism used in the system of FIG. 1.

Turning to the drawings, a system 1 of the present invention (FIGS. 1 and 2) for testing the adequacy of the brakes of a vehicle 3 includes a pair of parallel, spaced-apart runways 5. Each runway 5 includes a pair of ramps 7, a weight sensor mechanism or scale 9, a pair of braking plates 11 (with associated sensors—see FIG. 3), a pair of coupling plates 13, and a pair of spacer plates 15.

A metal threshold 17 routes electrical cables from the various sensors to a housing 19 which houses a 19" color CRT display 21, a Motorola 68000-type control microprocessor 23 (FIG. 2), a 32-bit Texas Instruments TMS34010-type graphics coprocessor 25 (FIG. 2), a printer 27, and a keyboard 29.

It is preferred that the upper surface of braking plates 11 be covered with steel mesh (not shown) to increase the friction between the tire and the braking surface, particularly during inclement weather. The plates are disposed so that, for a wide variety of four-wheel vehicles, each plate will be in contact with a corresponding tire 31 of the vehicle during the braking test.

Although any number of different types of sensors could be used to measure the braking forces, it is preferred that each braking force sensor (FIG. 3) include a load cell 33 disposed between the fixed chassis of the system and the corresponding braking plate 11. The output of each load cell 33 is supplied by a cable 35 to its corresponding microprocessor 37 disposed in a sealed aluminum housing 39 disposed in the brake plate. Each of the four sensor microprocessors 37 digitally transfers the braking force information acquired from its associated braking plate 11 to control microprocessor 23. Microprocessor 23, therefore, during a test continuously receives a stream of data from all four brake force sensors reflecting the current value of the braking force for each tire. Microprocessor 23 finds the maximum values for the braking forces for all four tires and from these maximum values computes various braking ratios, such as left to right and front to rear braking ratios.

Figure 1:
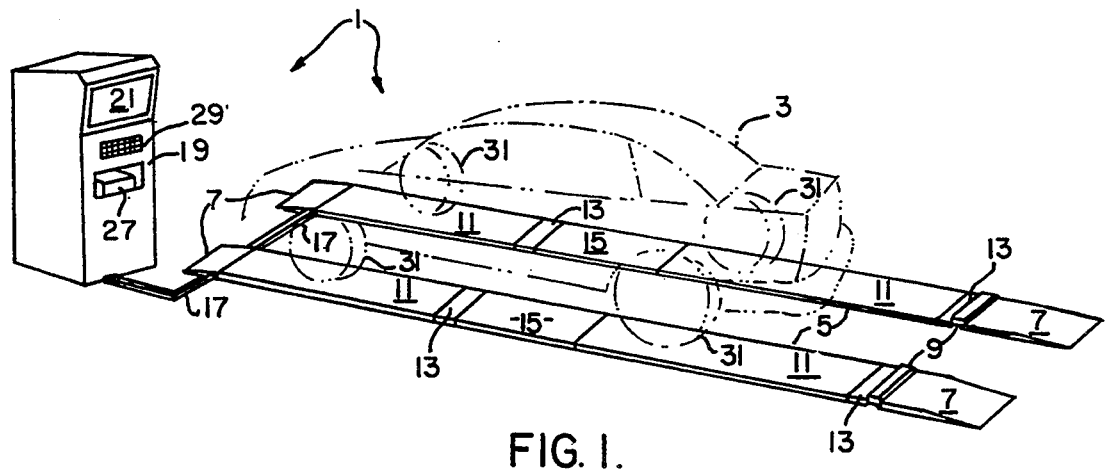
FIG. 1 is a perspective view of a brake testing system of the present invention.

Similarly, weight sensor mechanisms 9 can include any of a variety of sensors. The weight of the vehicle is important in determining both vehicle deceleration and vehicle dynamic weight distribution. The weigh scale in the preferred embodiment includes a chassis (not shown) which is bolted to the floor, a sensor assembly with two symmetrical force transducers (not shown), and a U-shaped weigh bar (the exterior of which is shown in FIG. 1) which connects the two transducers. The weight of one wheel is determined by the two transducers as the wheel is driven slowly over the weight bar 9. Other weighing mechanisms could also be used since the particular weighing mechanism used is of no real significance to the invention.

It is common in the art of plate brake testers, such as the tester of system 1, to measure the front axle brake force and compare it to the total vehicle brake force. This is easily accomplished with system 1 by summing the maximum forces measured by the two sensors corresponding to the front tires of the vehicle under test, summing the maximum forces measured by all four sensors, and then taking the ratio of the the two sums. This number of referred to in the art as the front/rear ratio and is generally displayed in units of percent front braking. For example, if a vehicle generates a maximum of 4000 newtons of brake force on the front axle and 2300 newtons of brake force on the rear axle, the front-/rear ratio is 63.5% front braking.

It is also common to compare this measured value with stored specifications, stored in the present invention in a memory 41 (FIG. 2) operatively connected to control microprocessor 23, to make a judgment on the brake balance of the vehicle. Typically, plate brake testers compare the measured value to a minimum percent front brake specification, which is normally set at around 50% front braking. This specification basically requires that a vehicle generate more brake force on the front axle than on the rear axle. Some plate brake testers also compare the measured value to a maximum percent front braking specification, typically around 95% front braking. This specification requires that the rear axle provide at least some of the total vehicle brake force. Both types of specifications are included in system 1.

Unfortunately, the optimal front/rear ratio of a vehicle is dependent on certain design parameters of the vehicle (static weight distribution, wheelbase, and center of gravity) as well as some test conditions (actual deceleration). The comparison of the actual vehicle measurements with absolute limits fails to take these dependencies into account.

For example, vehicles designed to carry cargo often will have considerably higher rear weight percentages when loaded than when unloaded. In the loaded condition, it is entirely possible that the nominal front/rear ratio for a vehicle will be very close to the minimum percent front braking specification. Traditionally, the front/rear ratio specifications have been set artificially wide to allow for such conditions and variations.

As mentioned above, the dynamic weight distribution of a vehicle is a function of the static weight distribution, the actual deceleration, the center of gravity of the vehicle, and the wheelbase of the vehicle. Although all of this information is known or knowable, it is not conveniently available for a thirty second test. Information about all models and makes of vehicle could be stored in memory 41, but the operator would have to input the vehicle make and model in order to access the right data for the vehicle under test. This would considerably increase the amount of time the operator would have to spend in performing the test.

Figure 4:
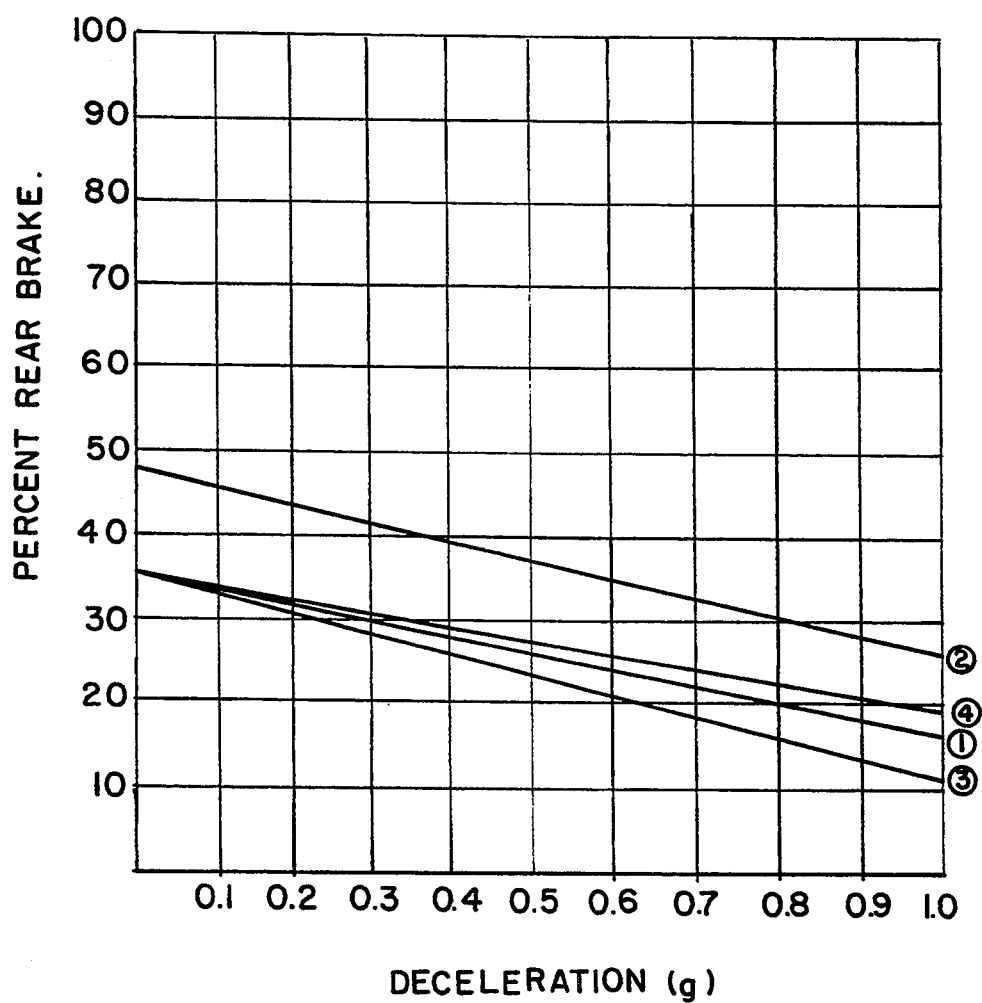
FIG. 4 is a chart illustrating the change in optimal rear braking force with deceleration for various vehicle parameters.

Instead of storing all this vehicle information, the present invention takes another approach. As illustrated in FIG. 4, the variation of optimal rear braking force with deceleration is linear for vehicles with a variety of design parameters. For example, line 1 in FIG. 4 represents a vehicle with a static weight distribution of 35% rear, a wheelbase of 110", and a center of gravity of 21.6"; line 2 represents a vehicle with a static weight distribution of 45% rear, a wheelbase of 110", and a center of gravity of 21.6"; line 3 represents a vehicle with a static weight distribution of 35% rear, a wheelbase of 90", and a center of gravity of 21.6"; and line 4 represents a vehicle with a static weight distribution of 35% rear, a wheelbase of 110", and a center of gravity of 18.6".

It has been found that the wheelbase of the vehicle under test can be estimated from the weight of the vehicle using the following algorithm:

$$\text{wheelbase} = (\text{weight} + 4222.01 \text{ lbs})/69.2125 \text{ lbs/in.}$$

Figure 5:
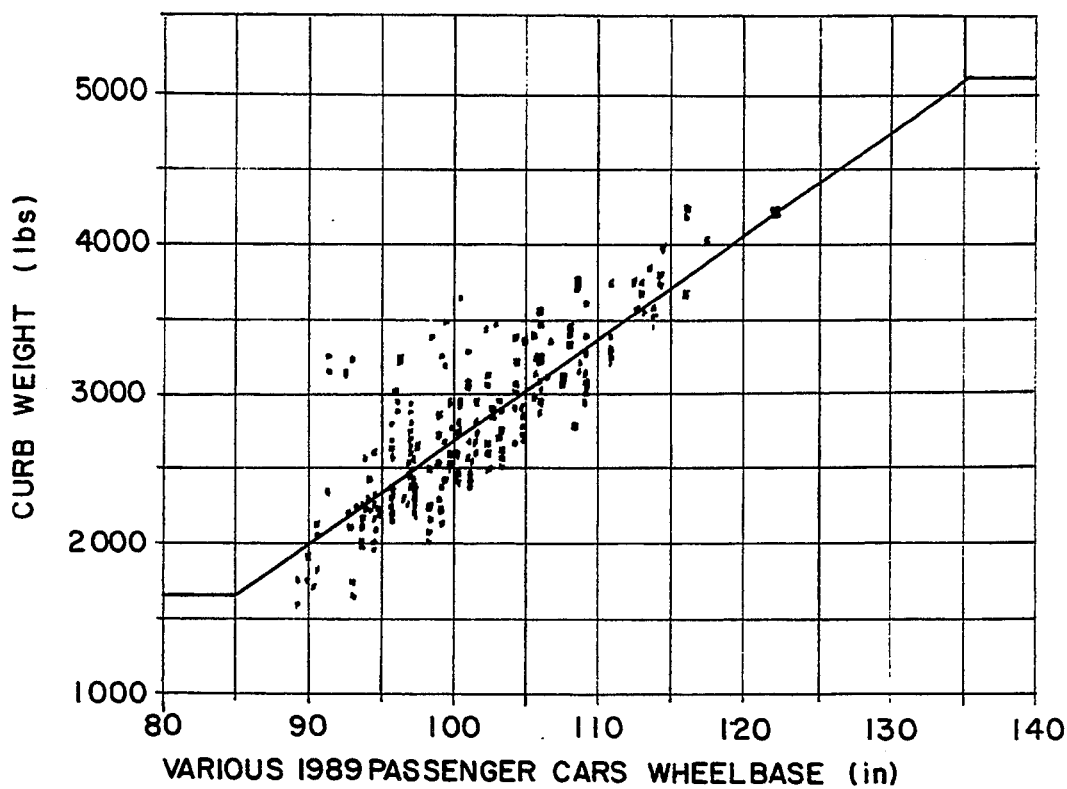
FIG. 5 is a plot of curb weight versus wheel base for numerous 1989 vehicles.

This algorithm is generated by applying a least squares analysis to the data plotted in FIG. 5 of vehicle weight versus wheelbase. Use of this estimate results in maximum errors of less than about two percent and mean errors of significantly under one percent.

Similarly, it has been found that the center of gravity of the vehicle under test can be estimated as 21.6 inches without introducing significant error into the calculation of dynamic weight distribution of the vehicle under test.

System 1 of the present invention uses these estimates of wheelbase and center of gravity to calculate the dynamic weight distribution of the vehicle under test using only the static weight distribution and the actual deceleration experienced during the test. The static weight distribution is determined by control microprocessor 23 from the weight scales 9 as the front tires and then the rear tires pass over the scales. The deceleration is calculated from the total measured weight (obtained by summing the weights from scales 9) and the total applied brake force (obtained by summing the data from brake force sensors 13).

Given these figures, the dynamic weight distribution is then calculated using the equation $$\%DRW = \%SRW - (\%d * \text{c.g. height(est.)})/WB(\text{est.})$$

where %DRW is the dynamic rear weight percentage, %SRW is the static rear weight percentage obtained from weight scales 9, %d is the actual deceleration as a percentage of gravity, c.g. height(est.) is 21.6 inches, and WB(est.) is calculated from the measured weight as described above. Alternatively, the operator may use keyboard 29 to enter the actual center of gravity height and wheelbase, or some other estimates of these parameters, if desired.

This equation gives a nominal preferred value for the front/rear ratio. However, the brakes of a vehicle can fall on either side of this value and still be acceptable. System 1 of the present invention allows the user to preset the limits about the nominal preferred value within which the brakes will be considered acceptable. Various jurisdictions have already set these limits by law or regulation. Such limits might be, for example, 20% maximum front bias over nominal and 15% maximum rear bias under nominal. Memory 41 has these relative limits preset for the various jurisdictions that have set such limits. The user can use keyboard 29 to select these predetermined limits or to preset other relative limits if desired.

The key feature of these relative limits is that they move with the calculated nominal preferred value for each test. The limits for a given vehicle will vary from test to test as the deceleration varies. Similarly, subsequent vehicles of differing weight distributions will have different limits even if the deceleration for each is exactly the same, because of that weight distribution difference.

Figure 6A:
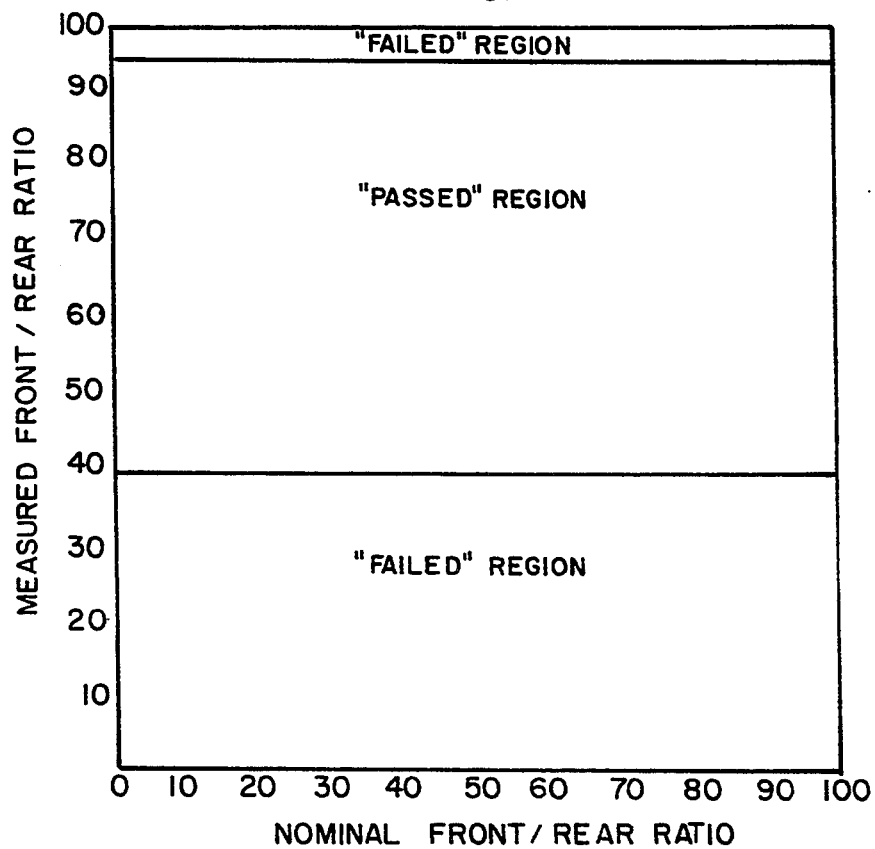
FIGS. 6A–6C are graphs illustrating the "passed" and "failed" regions for various testing schemes incorporated into the system of FIG. 1.

System 1, therefore, has two distinctly different types of limits for the acceptability of the brakes of a vehicle under test. The first type, the absolute limits, are like those of the prior art and are illustrated in FIG. 6A. Measured front/rear ratios exceeding some absolute upper limit (here 95%) of falling below some absolute lower limit (here 40%) are unacceptable. These absolute limits can be set by the operator using keyboard 29.

Figure 6B:
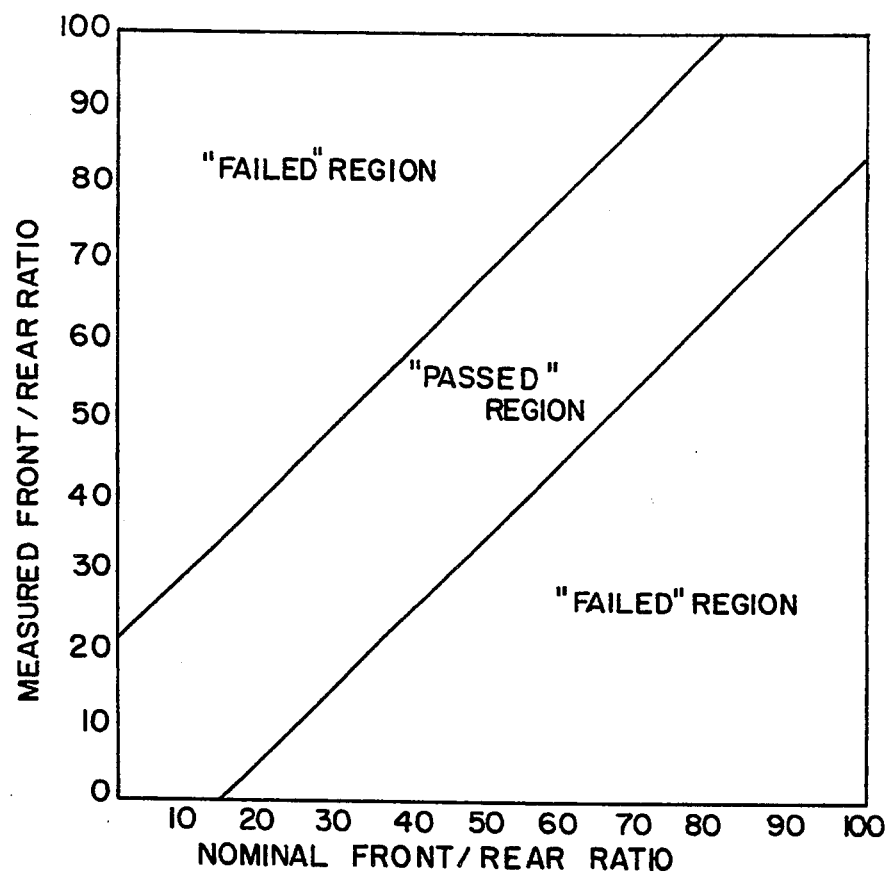

In addition, system 1 includes the movable limits illustrated in FIG. 6B. The optimal points, as displayed on this graph, would fall on a straight line going through the origin upwardly to the right at a 45-degree angle. The movable limits provide a band on either side of this line whose width is determined by the relative limits preset by the operator. In the case shown in FIG. 6B, a maximum front bias from optimal of 20% and a maximum rear bias from optimal of 15% is allowed.

Figure 6C:
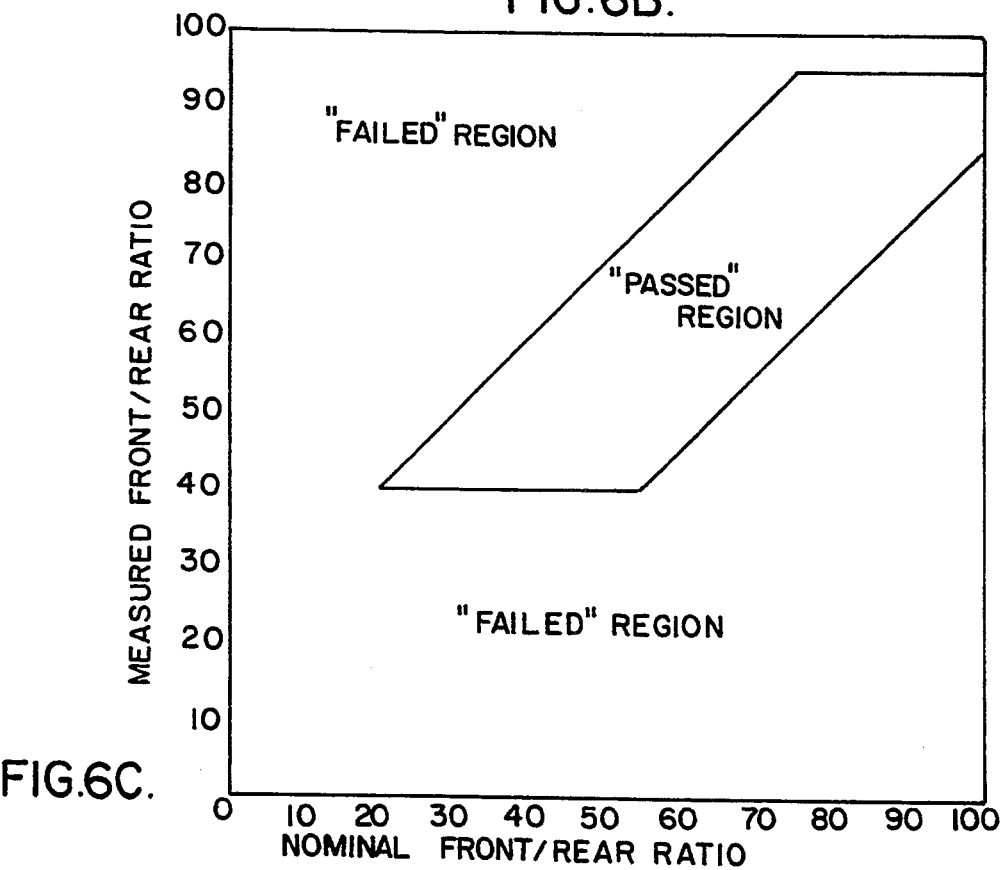

System 1 combines these two different types of limits by always using the tighter limit to obtain the limits shown in FIG. 6C. It should be appreciated that the "passed" region in FIG. 6C is much smaller than the prior art "passed" region of FIG. 6A and much more closely represents the desired braking forces needed under various conditions.

It should also be appreciated that system 1 also use other limits for determining the acceptability of the test and of the brakes. For example, the minimum and maximum decelerations which the system will accept for a valid test are set (by the operator, if desired). If the deceleration is too slow, the braking function may not be adequately tested. Similarly, deceleration which is too great may result in erratic readings. A typical lower deceleration limit would be 45% g, while a typical upper limit would be 95% g.

Limits on the acceptable ratios of left/right braking forces may also be preset by the operator for both the front and rear axles.

As mentioned above, control microprocessor 23 and graphics coprocessor 25 display the results of system 1 on color CRT display 21. Typical displays are shown in FIGS. 7–11. The control microprocessor takes the inputs from the various sensors and sends the information to graphics coprocessor 25 which rapidly updates display 21.

Figure 7:
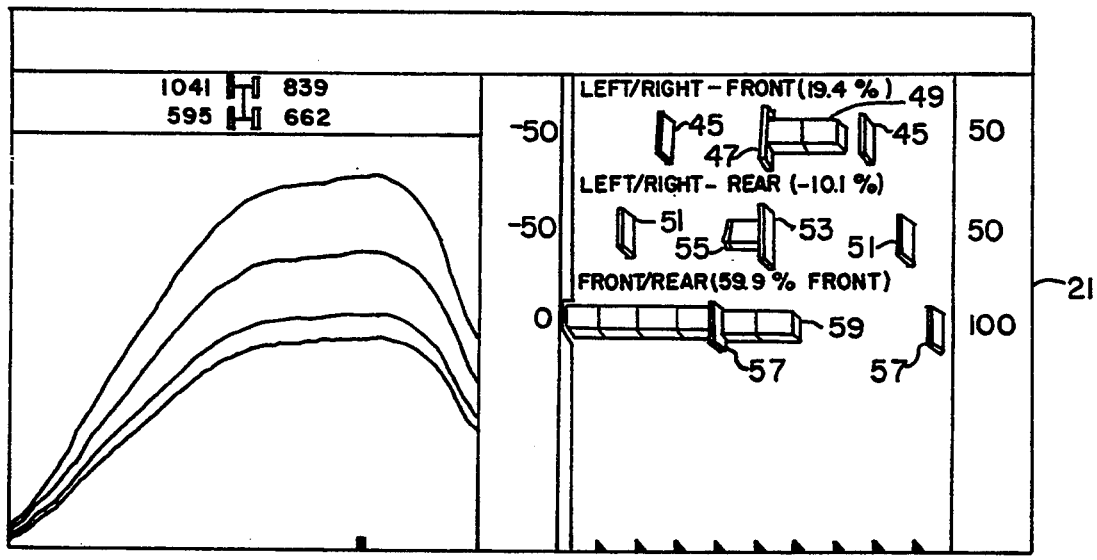
FIGS. 7–11 are graphical representations of the display used in the system of FIG. 1 for various vehicles and test conditions.

In FIG. 7, some typical results using the absolute limits are shown. The display in the upper left-hand corner has a schematic of the four wheels of the vehicle with the maximum measured braking forces listed beside the corresponding tires. Below that schematic is a graph on which is plotted the actual braking force values measured by the four braking force sensors during the test. Although not evident in the FIGS., the schematic and the measured forces graph are color coded so that the user can tell at a glance which line of the graph corresponds to which wheel of the vehicle. At the bottom of the graph are indicia indicating the point at which the graph reaches the maximum force values.

To the right of the schematic and the measured forces graph in FIG. 7 are a series of three bar graphs. Each bar graph includes a bar and two or more non-numeric indicia disposed along the longitudinal axis of the corresponding bar. The bars and the indicia give the appearance of being three-dimensional to facilitate comprehension of the data displayed.

The topmost bar graph shows the left/right braking force ratio for the front axle. The limits for this particular ratio have been set at 25% either side and these limits are indicated by the planar-looking indicia 45. A third planar-looking indicia 47 defines the midpoint for this graph. In the display as shown, the vehicle under test had a front axle left/right ratio of 19.4%, so the bar 49 extending from indicia 47 has a length which corresponds to this figure and extends in the direction of the weaker brake.

The middle bar graph of FIG. 7 shows the left/right ratio for the rear axle of the same vehicle. The limits for the rear axle are set at 35% in this particular example, so the limit indicia 51 are spaced accordingly a greater distance from the midpoint indicia 53. Since the left brake is the weaker for the rear axle, the bar 55 points in that direction.

The bottom bar graph of FIG. 7 shows the front/rear ratio with absolute limits of 40% and 95%. These limits are shown by corresponding planar-looking indicia 57. The actual front/rear ratio is 59.9% and this value is reflected in the length of bar 59.

In all these bar graphs, the bars themselves are white, indicating that the values are acceptable. If the values were not acceptable, the control microprocessor and graphics coprocessor would cause the bars to be red instead.

Figure 8:
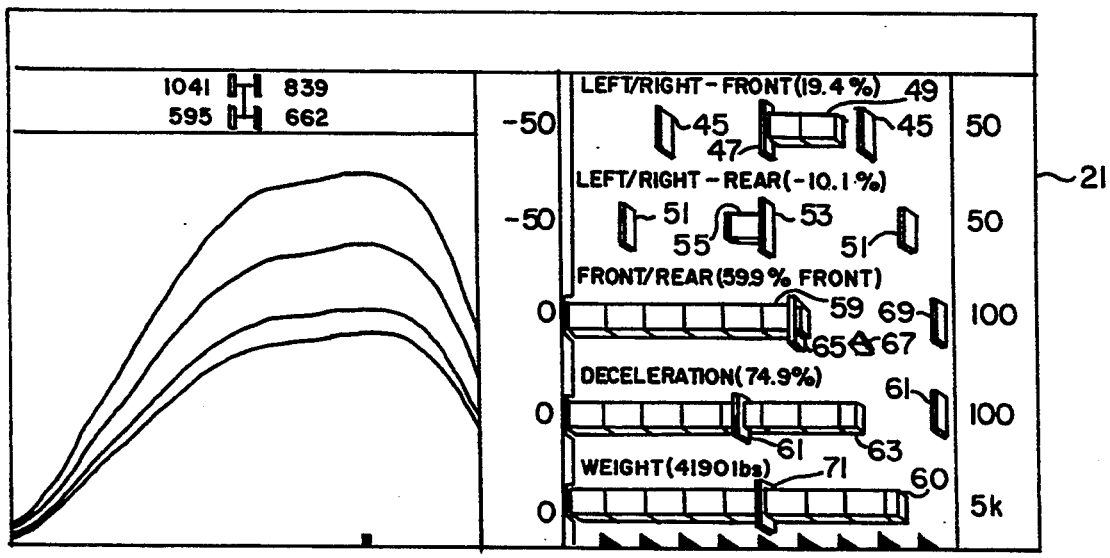

FIG. 8 illustrates the same test with the further application of the movable limits discussed above. The vehicle in this case weighs 4190 lbs, as measured by scales 9. A bar graph having a bar 60 representing that weight is displayed at the lower right-hand portion of display 21. From the deceleration and the measured braking forces, microprocessor 23 calculated the deceleration at 74.9%, which is well within the limits of 45% and 95% indicated by planar-looking indicia 61. A bar 63 representing that deceleration is displayed on display 21 below the front/rear ratio bar graph discussed in connection with FIG. 7.

With respect to the front/rear ratio, it should be noted that although the bar 59, representing the actual value, is the same in FIG. 8 as in FIG. 7, the indicia representing the limits are not. The lower limit, calculated as 15% below the nominal preferred value is now represented by a planar-looking indicia 65 which is just barely to the left of the terminus of bar 59. In fact, the nominal preferred value, represented by a prism-shaped indicia 67 in this particular test was 72%, so the lower limit was 57%. This lower limit, just barely smaller than the actual value of 59.9%, replaced the absolute (but lower) limit of 40%. The upper limit was also changed from 95% to 92% and is indicated by indicia 69. This is an example of how system 1 reveals that brakes which would have easily passed the prior art test (as indicated in FIG. 7) are revealed in FIG. 8 to in fact be marginal for a vehicle of that weight experiencing that deceleration.

Figure 9:
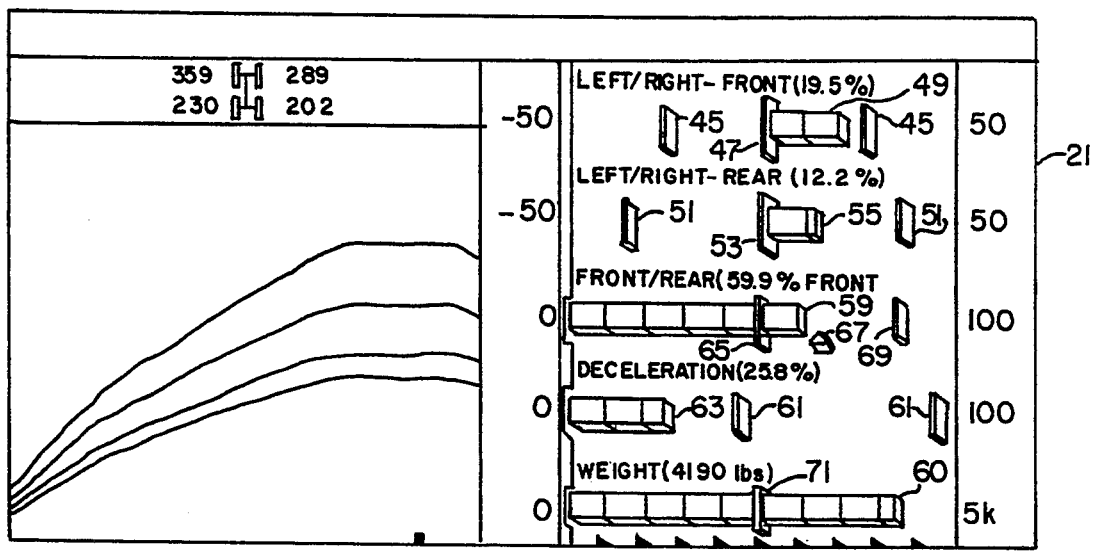

FIG. 9 is similar to FIG. 8. However, in this particular test the deceleration was too small, so the deceleration bar 63 is displayed on display 21 in red to quickly indicate to the operator that the test must be repeated. Moreover, because of the lesser deceleration, the dynamic weight distribution of the vehicle has changed. As a result, the nominal preferred value of the front-/rear ratio, shown by indicia 67, and the movable limits, shown by indicia 65 and 69, have been moved to the left (with respect to their positions in FIG. 8) to take into account the new dynamic weight distribution of the vehicle.

Figure 10:
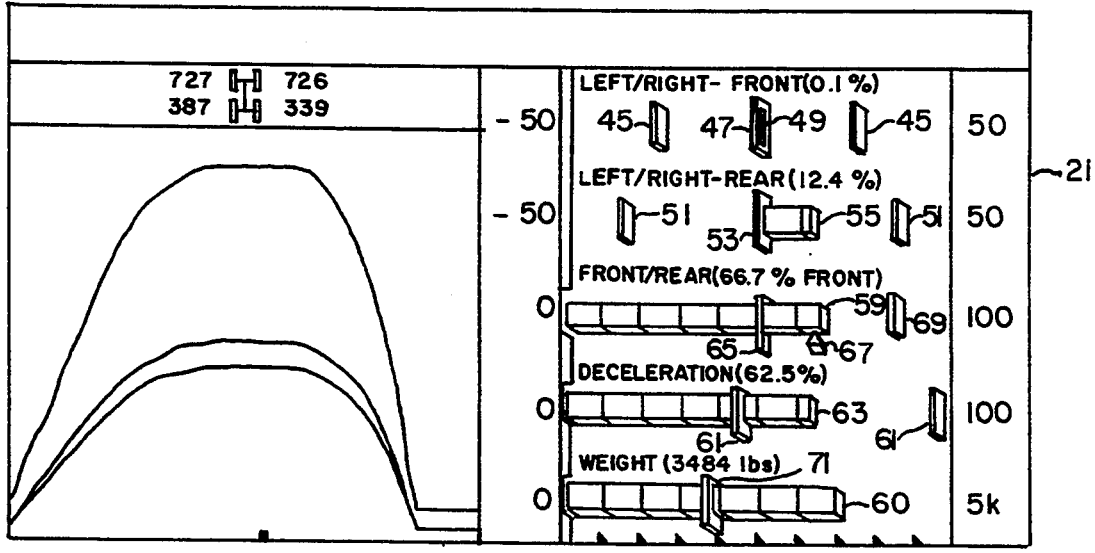

FIG. 10 is also similar to FIG. 8. It differs mainly in the fact that for the particular vehicle and deceleration represented by the display of FIG. 10, the measured front/rear ratio is almost exactly the same as the nominal preferred value. This is easily seen by the operator since the bar 59 terminates in the immediate vicinity of prism-shaped indicia 57.

Figure 11:
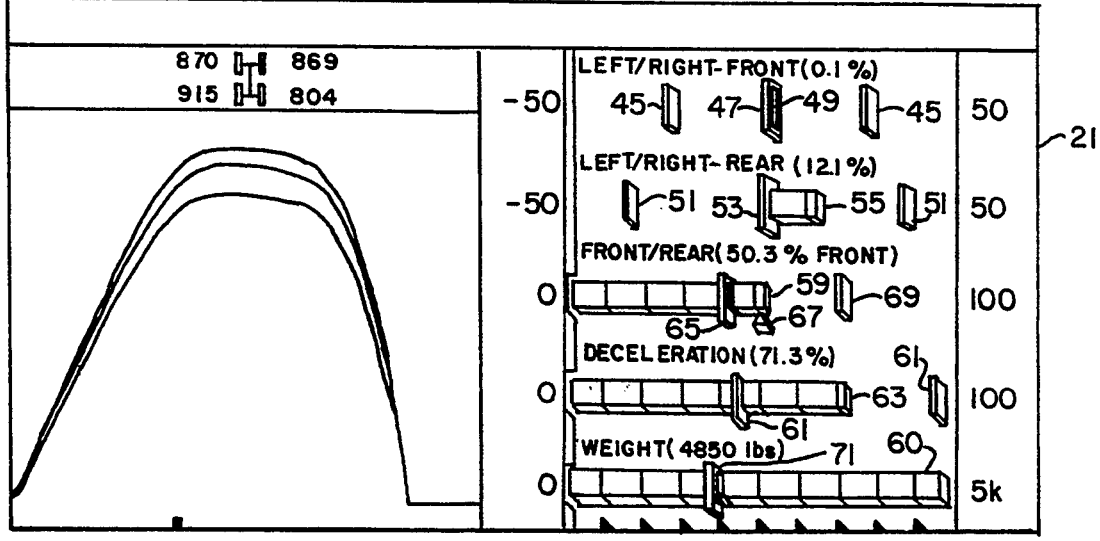

FIG. 11 is a display which might by typical of a loaded cargo van. The weight distribution, indicated by the planar-looking indicia 71 in the bottom bar graph shows that most of the weight is in the rear of the vehicle (as indicated by the fact that most of bar 60 is to the right of indicia 71). The front/rear ratio for this vehicle is only 50.3%, which with many prior art systems would be marginal at best. However, the position of the nominal preferred ratio indicia 67 on this display shows that for this vehicle under these conditions, the front-/rear ratio is almost exactly optimal. This is another example of the superiority of system 1 over prior art systems.

In view of the above it will be seen that the various objects and features of the present invention are achieved and other advantageous results obtained. As various changes could be made in the above constructions and methods without departing from the scope of the invention, it is intended that all matter contained in the above description or shown in the accompanying drawings shall be interpreted as illustrative and not in a limiting sense.

What is claimed is:

1. Plate brake tester for testing the brakes of a motor vehicle, comprising two pair of tread plates one beside the other, each of said tread plates having a measuring device for measuring the force exerted on the tread plate, a processing unit for processing measuring signals provided by at least two of the measuring devices, and a display, and further comprising a weighing device for determining the weight of the front axle and the rear axle of the vehicle, respectively, said processing unit being adapted to compute the braking retardation from the measured brake forces and the total weight of the vehicle and being adapted to compute the brake force ratio front axle/rear axle from the measured brake forces, said processing unit also being adapted to compute the dynamic weight ratio front axle/rear axle from the computed braking retardation, the wheelbase of the vehicle, the height of the center of gravity of the vehicle and the measured weight of the front axle and the rear axle, respectively, wherein the processing unit provides an indication through the display if said brake force ratio deviates from said dynamic weight ratio and this deviation exceeds threshold values.

2. Plate brake tester according to claim 1, wherein the processing unit provides an indication through the display if the deviation between said brake force ratio and the dynamic weight ratio shows that the rear wheel lock before the front wheels.

3. Plate brake tester according to claim 1, wherein the processing unit indicates said brake force ratio and said dynamic weight ratio as optimum brake force ratio on the display.

4. Plate brake tester according to claim 1, wherein the processing unit provides an indication through the display if the brake force of the rear wheels is less than 10% of the total brake force.

5. Plate brake tester according to claim 1, wherein the processing unit derives the wheel base of the vehicle by means of the measured vehicle weight wherein a predetermined value is taken for the height of the gravity center of the vehicle.

* * * * *